United States Patent [19]

Pitcher

[11] 4,432,563
[45] Feb. 21, 1984

[54] HITCHING GUIDANCE DEVICE

[76] Inventor: Laurence S. Pitcher, 1120 N. Logan Ave., Colorado Springs, Colo. 80909

[21] Appl. No.: 300,932

[22] Filed: Sep. 10, 1981

[51] Int. Cl.³ .............................................. B60D 1/14
[52] U.S. Cl. ................................. 280/477; 340/52 R; 340/686
[58] Field of Search .............. 280/477; 340/52 R, 686

[56] References Cited

U.S. PATENT DOCUMENTS

| | | | |
|---|---|---|---|
| 3,418,628 | 12/1968 | Fenner | 280/477 X |
| 3,731,274 | 5/1973 | Green | 340/52 R |
| 3,734,539 | 5/1973 | Salmi | 280/477 |
| 3,924,257 | 12/1975 | Roberts | 340/52 R |
| 3,938,122 | 2/1976 | Mangus | 340/275 |
| 4,030,775 | 6/1977 | Hill | 340/52 R |
| 4,122,390 | 10/1978 | Kollitz et al. | 324/65 R |
| 4,173,353 | 11/1979 | Steele | 280/477 |
| 4,186,939 | 2/1980 | Woods et al. | 280/477 |
| 4,187,494 | 2/1980 | Jessee | 340/52 R |

FOREIGN PATENT DOCUMENTS 529547  6/1955  Italy ................................... 280/477

Primary Examiner—John A. Pekar

[57] ABSTRACT

An improved hitching guidance device to facilitate the coupling of towing and towed units is herein presented. Such a device is advantageous when the towed unit, with its hitch ball receiver cup, cannot be readily visualized by the operator of the backing unit. The apparatus mounts on the hitch ball and uses electrical contacts, acting as switches, to sense the spatial orientation of a fine braided steel wire. This wire is wound under spring tension on an automatic reeling device and is stretched between the hitch ball and the hitch receiver cup where the wire is in turn fixed to the hitch cup in an exact and known location on the cup by a unique universal adapter clamp. Information relative to the position of the wire, and therefore relative to the position of the ball and receiver cup and their relationship to each other, is transmitted to the drivers area by a 6 conductor wire. This information is displayed on a guiding light console, visible to the towing vehicle operator. By appropriate response to the information displayed visually and audibly from this guiding light console, an operator can, with utmost precision, position the hitch ball of virtually any towing vehicle under the receiver cup of the towed unit, even under the most vexing of circumstances.

18 Claims, 8 Drawing Figures

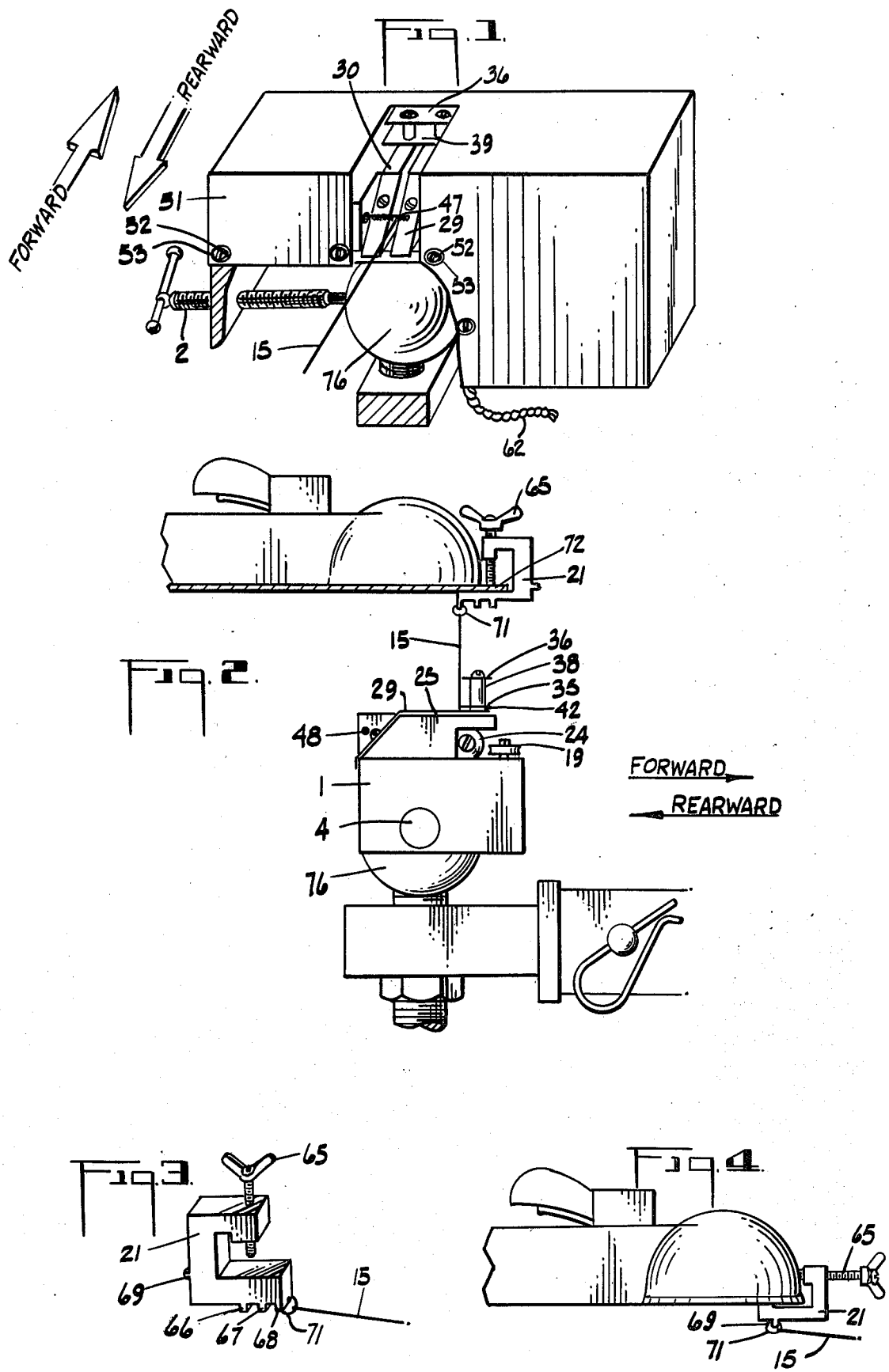

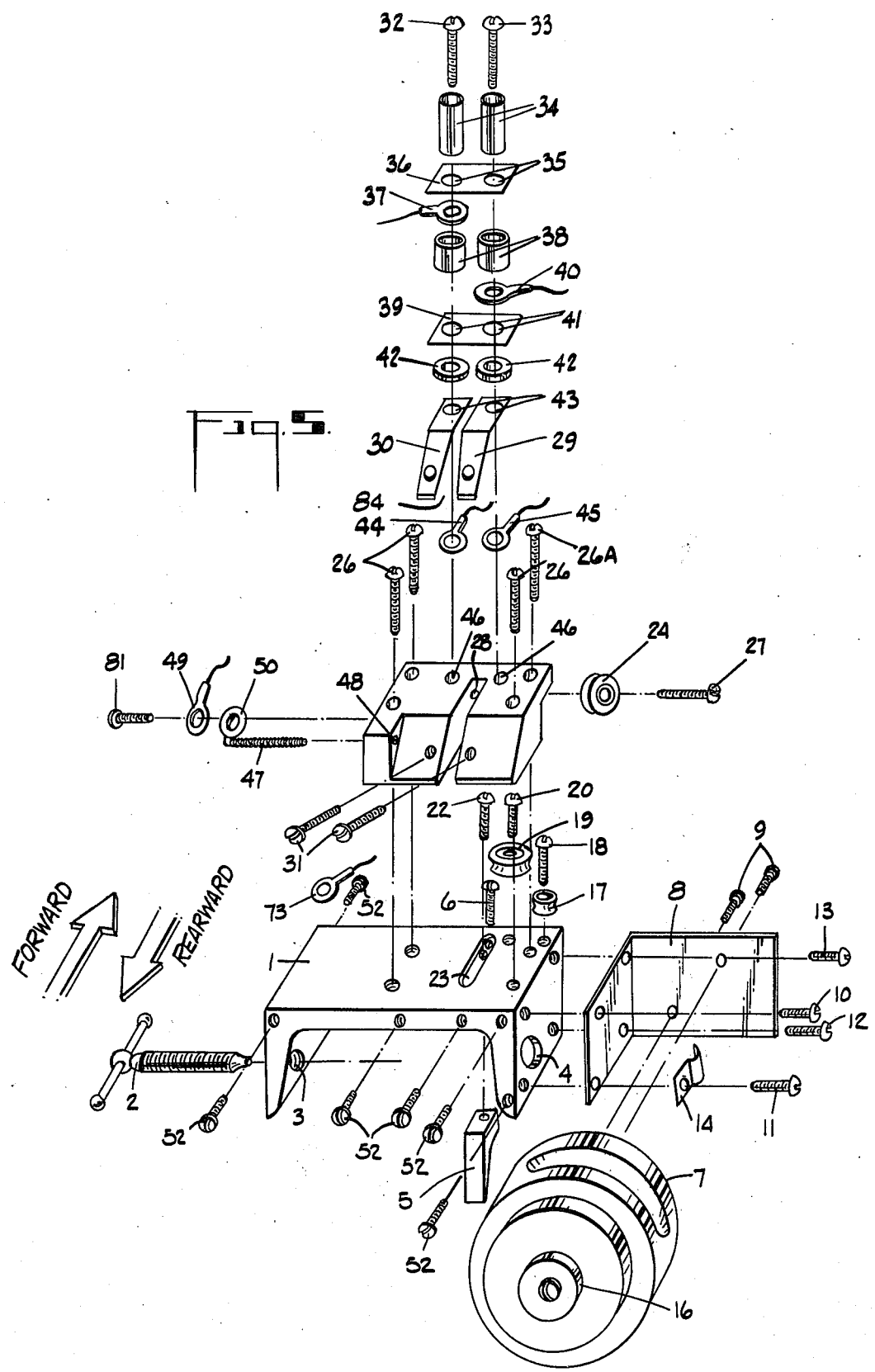

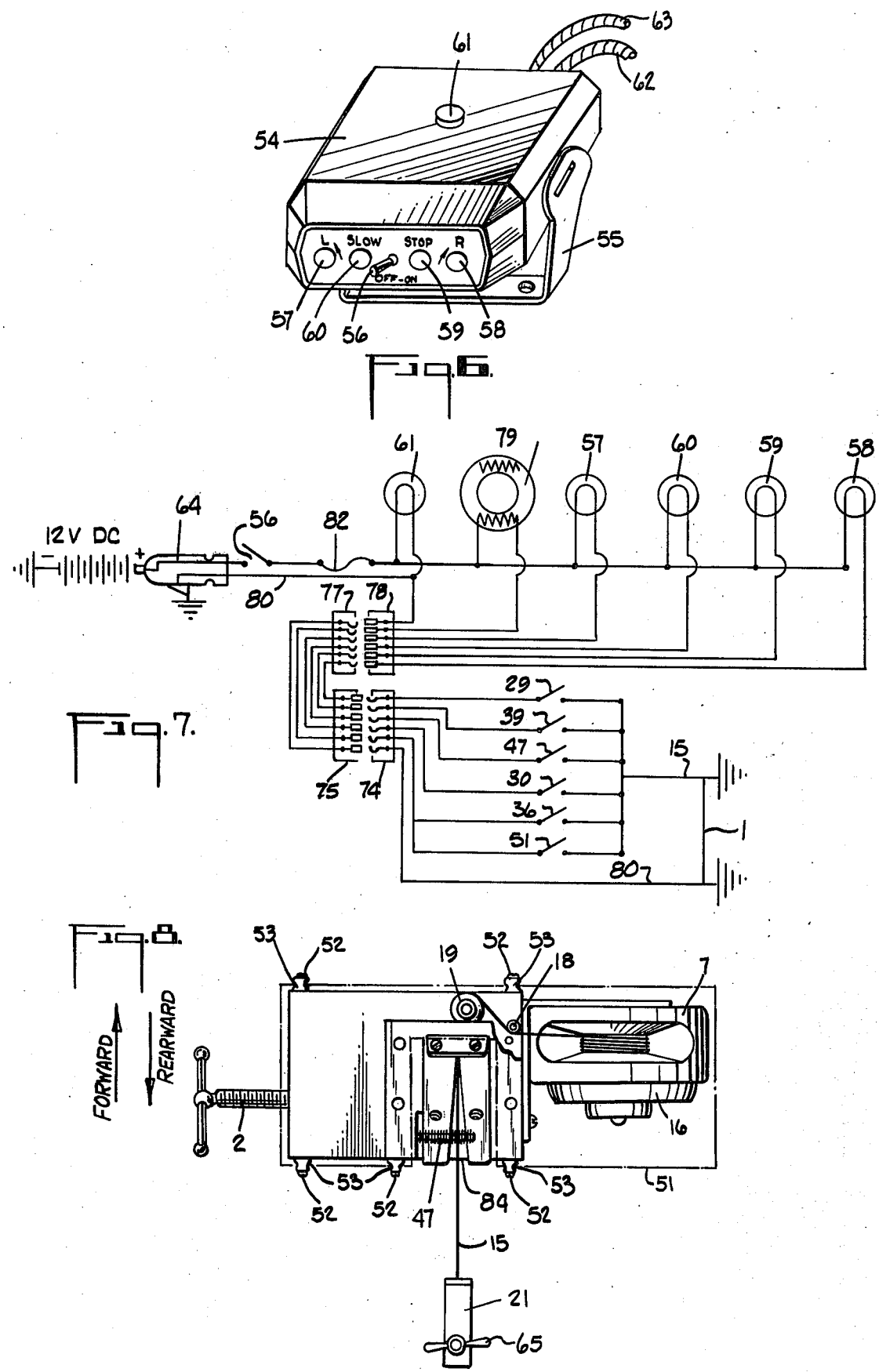

4,432,563

HITCHING GUIDANCE DEVICE

FIELD OF THE INVENTION

The present invention relates generally to devices that facilitate the connection of towing vehicles and towed units and, specifically, to devices that allow an operator of a motorized towing unit of recreational, industrial, or private wheeled vehicles to approach wheeled towed units such as trailers, wherein these towing units utilize a 2 inch or 1⅞ inch hitch ball and trailer units have a matching receiver cup. This invention relates specifically to situations where this coupling process must be accomplished under difficult or trying conditions wherein the operator, from reasons of obstructive impairment, cannot directly visualize the ball and/or obtain help to overcome such impairment, and where this placement of hitch ball under receiver cup must be of an accurate nature insomuch as said hitch ball and/or receiver cup cannot be readily moved after inaccurate backing has occurred. In consideration also, are situations wherein the backing vehicle must do so from an angle in either a horizontal or vertical axis. After backing, to approximate the hitch ball under the receiver cup with a precision of ½ hitch ball diameter or less of dead center, can and should be accomplished by a hitching device that purports to do so and this is to be done in both left to right and front to rear axis.

HISTORY OF PRIOR ART

Though the inventor, through the evolution and development of his own original concept, arrived at the herein presented and described improved hitching guidance device without prior knowledge of the art, subsequent research associated with patent search and application disclosed much activity in the field of vehicle coupling aids and devices to aid in the blind backing of towing vehicle to towed unit. All of the activity that the inventor is aware and all that relates to his invention is cited herein and references made thereto and prior knowledge certified. This inventors device, though a combination of several predisclosed modalities, modifies the best of these old elements then adds several new, critical attributes that finally make such an improved hitch guiding device practical, functional, precise, economically feasible, virtually universal, commercially producible, and certainly patentable.

Such devices, as disclosed in the past that are known to this inventor have major flows, not the least of which has been the complicated and devious means to accomplish what in this improved hitching guidance device is a straight forward and simple chain of events that lead to the successful and exact coupling of towing and towed vehicle, by one person, without requirement of visualization of the towed unit during approach. Placing the ball in the vicinity of the hitch cup is not enough. Guiding the towing vehicle towards the cup is not enough. The hitch ball must be placed under the hitch cup with an accuracy that allows the cup to be lowered onto the ball without further adjustment.

Certainly using a conductive wire to connect a sensing unit to the hitch cup is known. Both Salimi, U.S. Pat. No. 3,734,539 and Mangus, U.S. Pat. No. 3,938,122 mention such a wire. Stop indicator lights and/or tones are known: Jessee, U.S. Pat. No. 187,494, Mangus and others refer to the visual and audible signals. Right and left turn indicators in the form of lights or needle deflections are disclosed in Woods, U.S. Pat. No. 4,186,939, Mangus, Salimi and others. Touch contact switches are mentioned by Salimi, Jessee, and Mangus. Automatic reeling devices to keep taught a wire or string are touched upon by Jessee, Mangus, and others. Cigarette (Cigar) lighter adaptation is mentioned by Mangus. Warning or caution signals appear in Salimi. Thus it may be seen, following inspection of the herein presented form, many of its elements have been disclosed in the prior art. In all cases seen by this inventor, however, the attempts to produce a desirable result fall short of success.

The present embodiment adds new elements and form to the pre-existing art that set it apart and allow it to supersede the prior art in both form and function. The improved hitching guidance device is ball mouted and in so being, adds accuracy and versatility to the art. In the present embodiment, a provision is allowed for over run, with indication of that over run to the operator, and provides for simple correction and exact placement in that critical forward-rearward axis. The invention herein disclosed provides a protective case, wired into a buzzer circuit, that signals gross mis-approach of the backing to the stationary unit and warns of untoward collision if such improper positions indeed exist. The present invention provides a simple, unique, and universal clamp device to attach the wire used in this invention to the hitch receiver cup. As important as any of the aforementioned virtues is the fact that the present embodiment can be used on several and all vehicles and towed units, this versatility being accomplished without otherwise defacing or altering the vehicles or towed units involved.

BRIEF DESCRIPTION OF THE DRAWINGS

FIG. 1. A perspective of the hitch ball mounted unit on a representative hitch ball.

FIG. 2. Shows the hitch ball mounted unit, cover and some apparatus removed, as it would appear upon successful placement of hitch ball under receiver cup.

FIG. 3. A perspective of the universal mounting clamp.

FIG. 4. Shows the universal mounting clamp mounted on an older type hitch cup.

FIG. 5. An exploded view of the hitch ball mounted unit showing each part and its relation to each other part of the unit.

FIG. 6. The guiding light console.

FIG. 7. A schematic representation of the wiring diagram for the improved hitching guidance device.

FIG. 8. A top view of the hitch ball mounted unit, some apparatus removed, the protective cover outlined in shadow.

DETAILED DESCRIPTION OF THE INVENTION

The improved hitching guidance device herein depicted and described, is universally adaptable to any hitch ball of 2 inch or 1⅞ inch diameter. Because of its slim line, it will fit on any ball that has clearance of 1 inch or more between ball and most rearward projection of bumper.

The device consists of four basic elements:

The hitch ball mounted unit (FIGS. 1, 2, 5, and 8).
The guiding light console (FIG. 6).
The universal adapter clamp (FIGS. 2, 3, 4, and 8).
The 22 gauge unshielded 6 conductor cable and connectors (FIGS. 1, 6, and 7).

Forward, as used in the following text, is defined as toward the front of the vehicle as the hitch ball mounted unit is in place (FIG. 1), rearward being away from the front of the vehicle.

The hitch ball mounted unit (FIG. 5) is formed from a base (1) of 4 inch wide aluminum channel material. The forward-rearward dimension of the aluminum base is 2¾ inches. A ⅜ inch diameter clamp screw (2) through the threaded hole (3) in the base provides the means by which the unit is clamped to a hitch ball. A contoured hole (4) directly opposite the threaded hole, provides a seat for the hitch ball upon tightening of the clamp screw. This seat insures a tight and secure grip on both 2 inch and 1⅞ inch hitch balls. The hole (4) and clamp screw (2) are so aligned that when a 2 inch hitch ball is secured, its top will rest on the bottom of the aluminum base. A smaller ball of 1⅞ inch will also be securely held, though there will be a small space between ball top and aluminum base. A back stop rest (5) is placed two inches from the rearward edge of the aluminum base. This back stop is held in place by a 4/40 machine screw (6) or is welded to the base. The back stop helps position the ball when clamping the unit on the ball. The automatic reel (7) is held to the aluminum base by the mounting bracket (8). Two 4/40 machine screws (9) hold the reel to the bracket. Four 4/40 machine screws (10, 11, 12, and 13) in turn affix the reel mounting bracket to the aluminum base. The machine screw (10) is used also to secure the ground wire (80) of the device while the machine screw (11) secures the bracket (14) that holds the 6 conductor wire (62) in place prior to its exit from the ball mounted unit. Thirty-five to forty feet of 0.015 braided stainless steel wire (15) is wound onto the reel spring by rotating the winding mechanism of the reel (16). The reeling mechanism is a commercially available product and is widely used as an automatic line reeling device for use with a fly fishing rod. The reel is slightly modified for use in this apparatus. The wire (15) is led from the reel around the rearward side of the plastic guide wheel (17). The plastic guide wheel is held to the aluminum base by a 4/40 machine screw (18). The wire (15) is then passed forward around the direction reversing slotted pulley wheel (19). The direction reversing wheel is held in place by a 4/40 machine screw (20). The wire (15) is then passed rearward and is carried beyond the rearward edge of the aluminum base, at which point it is attached to the universal mounting clamp (21) by the ring (71). The 2/56 guide screw (22) is so placed that the wire (15) passes between it and the reversing wheel (19). This guide screw prevents the wire from flying off the wheel during rapid winding of the wire on the reel (7). An area of the mounting base is hollowed out (23). This allows the vertical direction guide wheel (24) to be recessed into the base. This recessing in turn insures that the wire (15), passing beneath the vertical guide wheel (24) and through the groove therein, will stay in said groove and not be displaced out of said groove when lateral movement is applied to said wire.

The contact switch mounting base (25) is attached to the aluminum base by 4-4/40 machine screws (26). This base is so formed as to properly position and align all of the elements that attach to it.

The machine screw (26-A) for the base acts as a guide for the wire (15) as said wire passes between the mounting screw (26-A) and the plastic guide wheel (17) and so prevents the wire from flying off said wheel during rapid in winding of said wire. The base (25) itself is made of lucite plastic or some other non-conductive material so as to insure the integrity in the circuits of the various contact switches attached to it and effectively insulate said switches from each other and from the aluminum mounting base (1). The vertical guiding wheel (24) is held to this base by a 4/40 machine screw (27) and is attached so that it is exactly centered in the slot (28) of the plastic base. The right (29) and left (30) contact switches are held to this plastic base by the two 4/40 machine screws (31) and the two 4/40 stack mounting machine screws (32) and (33). The stacked arrangement of the elements mounted on the stacked mounting screws (FIG. 8) is critical to the uniqueness and success of the improved hitching guidance device. The stack mounting screws (32) and (33) are encased in heat shrink insulated tubing (34) for their entire length. This insures that no contact will be made by the metal screws to cause short circuits. The stack mounting screws with insulation in place, go through the holes (35) in the over run warning buzzer contact switch (36). All of the contact switches are made of sheet metal material. The insulated solderless ring terminal (37) then slips over the stack screw (32) and, upon tightening of the stack screw, will be in direct contact with the warning buzzer contact switch (36) and the circuit for the over run warning buzzer is thus established. Next, the insulated spacers (38) are slipped over the stack screws. These spacers keep the over run warning buzzer contact switch (36) and the stop contact switch (39) apart by ¼ inch. The insulated solderless connector (40) is then slipped over the stack screw (33). This connector will be in direct contact with the stop contact switch (39) and upon tightening of the stack screw (32) will establish the stop circuit. The stop contact switch (39) is now slipped over the stack screws through the holes (41). Next, the 1/16 inch insulated spacers (42) are slipped over the stack screws. These spacers provide a spacing separation between the stop contact switch (39) and the right (29) and left (30) turn contact switches. The stack screws are now placed through the holes (43) in the right (29) and left (30) turn contact switches. Now the insulated solderless connectors (44) and (45) are slipped over the stack screws and thus the solderless connector (45) will be in direct contact with the right contact switch (29) and the solderless connector (44) will be in direct contact with the left contact switch (30) and upon tightening of the stack screws, the right and left turn circuits will be established. The stack screws are now tightened into threaded holes (46) in the plastic mounting base and tightened to hold all of the stacked elements securely in place and in their proper relationship. The wiring schematic of the various contact switches and solderless connectors may be seen (FIG. 5). The approach warning spring (47) is now inserted through the hole (48) in the plastic mounting block. This spring is made of tightly wound 0.010 orthodontic spring wire. The 4/40 machine screw (81) is then passed through the insulated solderless connector (49) and in turn through the connector loop (50) attached to the spring (47) and, finally, tightened into a threaded hole (not shown) in the plastic mounting block to secure the spring and electrical connection and establishing the circuit for the warning lamp (60). Next, the sheet aluminum case (51) is attached to the wiring harness by an insulated solderless connector (FIGS. 5-73). The case is in turn attached to the aluminum mounting base by eight 4/40 machine screws (52) that pass through eight insulated grommets (53) in the case, (FIG. 1). These grommets effectively insulate the case from all other elements of the apparatus, making the case itself a contact switch.

The guiding light console (FIG. 6) consists of a case (54) 4×4½×1½ inches. This case is made of moulded plastic and is disclosed to be commercially available at many electronic supply retail outlets. The case is provided with a mounting bracket (55) suitable for mounting on dashboards, etc. Inside the case (FIG. 6) is an electronic mounting board, small buzzer (79), light bulbs (61, 57, 60, 59, and 58), fuse (82), and wires as needed. Showing externally on the guiding light console are the five light bulbs covered with plastic lenses and a SPST miniature switch (56). The lenses are colored as follows: turn left; green, turn right; green, stop; red, approach warning; amber. On the top of the case is a light bulb 61 covered with a red lens to serve as an on-off indicator lamp. Exiting from the rear of the case is a 6 conductor 22 gauge unshielded cable 62, plastic covered. Also exiting from the rear of the case is a two conductor coiled cable (63) with a cigarette (cigar) lighter adapter (64).

The universal hitch adapter clamp, (FIG. 3), consists of a piece of ¼ inch aluminum plate shaped into the special form that allows it to fit most trailer hitch cup designs. A wing nut and 6/32 machine screw (65) fit into a threaded hole in the top of the universal adapter. Three fins (66, 67, and 68) extend from the bottom of the clamp. A fourth fin (69) is seen on the back of the clamp. Each fin has a 1/16 hole (70) drilled through it to provide mounting for the ring (71) to which the wire (15) is attached. The fins (66, 67, and 68) are spaced to provide points to which the ring (71) may be attached to compensate for trailer hitch cup designs of varying thickness. The fin (69) is provided to accommodate the ring (71) for application to older hitch cup designs that have no flange (72) about the hitch cup, (FIG. 4).

Operation of the improved hitching guidance device begins with the placement of the hitch ball mounted unit on the vehicles hitch ball (76), (FIG. 1). It is placed on the ball with the open slot facing rearward toward the hitch cup to be approached. The screw clamp (2) is tightened against the ball, forcing the opposite side of the ball into the contoured hole (4). This effectively and firmly holds the unit onto the ball in a manner sufficient to resist forces applied to it during wire extension and backing. The unit is secured to the ball so that the flat upper surface of the protective aluminum case (51) is level with the vehicle (exact levelness is not necessary) and so the forward surface of the unit is parallel in relation to the back surface of the vehicle (exact squareness also is not necessary). The unit, thus secured to the ball, is in a special relationship to the ball. An extension of a mid-sagittal cut of the ball would pass upward through the center of the slot (28) in the plastic mounting block and between the contact switches (29) and (30). Also, mounted thusly, a vertical line drawn just touching the rearward portion of the slot of the vertical directing guide wheel (24) would contact the ball ¼ inch rearward of its most forward surface. The protective case (51) is mounted so that no portion of it touches any surface of the backing vehicle, this is to insure that the case is not grounded. With the hitch ball mounted unit properly placed, connection is made to the electrical cable (62) by plugging the six pin connector (74) into the receptical (75). The vehicle length cable (62) may be routed internally through the vehicle in permanent installations or externally in temporary installations. The length of the cable is not critical. The vehicle should be within 30 feet of the hitch cup to be approached. This device may be used at any angle compatible to approach the hitch cup without collision of parts of the vehicle and trailer and may be used in an uphill or downhill manner as long as the ball and hitch ball mounted unit will pass under the hitch cup with the minimum clearance of 1 inch. Maximum clearance is not a critical factor. With the towing vehicle in an appropriate approach position, the universal adapter clamp (21) should then be grasped. The clamp (21), with its attached wire (15), should then be taken to the hitch receiver cup, the wire automatically reeling out of the ball mounted unit. The clamp should then be affixed to the hitch cup, (FIG. 2 and FIG. 4). It is noted here that the ring (71) should be in the fin (66, 67, or 68) that most closely approximates the inside forward lip of the receiver cup. The machine screw and wing nut (65) is screwed down pressing against the cup flange (72) with sufficient pressure to prevent dislodgement during subsequent backing procedures. The clamp (21) should be placed in the median sagittal plane of the cup for direct or straight line backing and should be placed slightly to the right or left of said median sagittal plane if the vehicle is approaching at an angle, that deviation being in a direction toward said vehicle. The clamp in place, the operator next assures himself that the hitch receiver cup will clear the ball mounted unit by at least 1 inch and being so assured proceeds to the drivers area to begin backing towards completion of the coupling effort. Once in the drivers area, the operator connects the guiding light console to the cable (62) via the 6 prong connectors (77) and (78). He then plugs the adapter (64) into the cigarette lighter. In permanent installations this connection to power could be accomplished by permanent wiring to positive power source and ground. The operator then turns the switch (56) on, the pilot lamp (61) glows insuring power to the unit and proper ground. The ball mounted unit is grounded at the power source, (FIG. 7) to insure operation in cases of improper ball ground as frequents some hitch ball arrangements. As backing commences, a first rule must always be observed, back slowly. No light shown on the guiding light console indicates that the wire (15), which acts as a grounding or closing of the contact switches (29, 30, 36, 39, 47, and case 51), is touching none of them and therefore the vehicle is on a direct path to the receiver cup. The automatic reeling device (7) automatically draws the wire (15) in as backing proceeds, keeping the wire taught at all times. As backing continues and deviation from a direct path to the ball develops, the wire deflects to the left or right depending on the direction of error of the backing vehicle, and ultimately the wire (15) touches the right (29) or left (30) contact switch. Assuming that said deviation is to the left, i.e. the vehicle is directing to the left of center of a direct line to the hitch cup, the wire (15) will contact the right contact switch (29). This completes the circuit for the right indicator light (58) causing it to glow. By then turning the steering wheel of the vehicle to the right, or clockwise, the vehicle will alter direction and the ball will begin to swing to the right. When once again the ball is on a direct path to the receiver cup, the wire will touch no contact switch and no light on the panel will glow. If over correction is resultant, the ball will begin to swing to the right too far, this in turn will cause the wire (15), ultimately, to touch the left contact switch (30)

and close the circuit to the left turn indicator light (57) causing it to glow. At this juncture, it is necessary to turn the steering wheel to the left, or counter clockwise, this to alter the course and movement of the ball to the left. When no light glows, it indicates once again that the ball is on a direct path to the receiver cup. Thus it can be seen, by walking the wire, the vehicle can be kept on a direct path to the hitch receiver cup. The contacts (29) and (30) are wider apart at the base and taper together as the stop contact switch (39) is reached, the width at the base being ¼ inch (84) and the width at the stop contact switch (39) 1/16 inch. This tapering of the contact switches is to necessitate less correction when the receiver cup is at distance and more precise correction as the ball nears ints final destination. Here it should be noted that the previously mentioned electrically insulated aluminum protective case (51) of the hitch ball bounted unit is of importance. If the deviation of the ball from a direct path to the cup is too great, especially as vertical wire position is neared, the wire (15) will contact not only the contact switch on the side of the deviation but also the protective case. By touching this protective case with the wire, the buzzer circuit is closed, thus alerting the operator of grossly improper approach angle. The insulated protective case (51) serves another very important purpose. If the hitch receiver cup has not been properly elevated to allow the necessary 1 inch clearance as the ball passes under the cup, contact with the hitch cup, or the universal adaptor clamp, will close the buzzer circuit, causing the warning buzzer to sound. Thus if the warning buzzer (79) sounds prior to the glowing of the stop lamp (59) on the guiding light console, the operator is warned of improper procedure and should stop immediately, remove himself to the rear of the vehicle, and see what is amiss. Assuming all is well as the backing procedure successfully continues, it can be seen that the wire (15) will begin ascent from a more or less horizontal plane to a more vertical plane as the ball mounted unit approaches the elevated hitch receiver cup. This increased angle of the wire will be more marked the closer the ball mounted unit and hitch receiver cup approximate each other. As the wire (15) reaches approximately 4 degrees above horizontal, it will touch the proximity warning spring (47). Contact with this warning spring closes the circuit to the proximity warning light (60) on the guiding light console causing it to glow. The illumination of this warning light tells the vehicle operator that the hitch ball is very near, 6 to 24 inches depending on the vertical distance that the cup will clear the ball mounted unit. Upon illumination of this warning light, the operator should immediately stop, then continue backing with extreme caution. As backing continues, the proximity warning spring is swept aside. When this takes place, the warning light (60) goes out. This once more gives the operator indication that he is indeed very close to a desired coupling position. Continued backing then allows the wire to be carried to vertical. It should be noted here that, as the wire approaches vertical, it rotates about the grooved vertical guiding pulley wheel (24). The pulley wheel (24) acts as a guide for the wire and also keeps it centered laterally and insures that when the wire is at vertical its relationship to the hitch ball below is proper. When the wire reaches exactly vertical, it touches the stop contact switch (39). This closes the circuit to the stop light (59) on the guiding light console causing it to glow. The operator should immediately stop. In practice, it is all but impossible to stop at this precise moment. Over-run is to be expected. As the wire moves past vertical in a forward direction, the over-run buzzer contact switch (36) is touched by the wire and the warning buzzer circuit is closed, causing the warning buzzer to sound in the guiding light console. The over-run warning buzzer contact switch (36) is placed 1/16 inch forward of the stop contact switch. Thus it is manifest that the stop contact switch (39) will be touched first as the wire reaches vertical, closely followed by contact with the warning buzzer contact switch (36), beyond vertical. Immediate halt should be encouraged by the sounding of the buzzer. The stopped vehicle should then be pulled forward until the buzzer no longer sounds and the vehicle position adjusted so that the stop lamp (59) is on and the buzzer is off. Thus it can be seen that by the design of the ball mounted unit and its relationship to the properlay placed universal adapter clamp, when the stop lamp (59) is illuminated, the buzzer (79) is off, and no right (58) or left (57) turn lamp is illuminated, the wire will be at vertical and therefore the hitch receiver cup will be directly over the hitch ball. It should be noted here that the entire unit; switches, lights, buzzer, etc., operate on 12 Volt DC negative ground, supplied by the motorized vehicle.

This accuracy of placement of ball under receiver cup, because of the design and position of the contact switches (29, 30, 39, and 36) will be ⅛ hitch ball diameter or less of dead center of ball under cup. This accuracy applies to both 2 inch and 1⅞ inch hitch balls. After successfully placing the hitch ball under the receiver cup, the ball mounted unit of the improved hitching guidance device is removed from the ball, the 6 prong connectors (74) and (75) are disconnected, and the receiver cup is lowered onto the ball without further adjustment and the hitch cup secured to the ball in the usual fashion.

I claim:

1. A guidance apparatus to assist the operator of a towing vehicle when maneuvering the towing vehicle to align a hitch element of the towing vehicle with a hitch element of a towed vehicle, the apparatus comprising:

electrical conductor line connectible between the two vehicles;

means, operatively associated with the line, for sensing the relative positions of the towing vehicle hitch element and the towed vehicle hitch element when maneuvering the towing vehicle to align the hitch elements; and means for detachably mounting the sensing means directly on one of the hitch elements in such a manner that the sensing means will be properly positioned so that additional procedures will not be required to reference the relative positions of the sensing means and hitch elements before using the guidance apparatus, said mounting means comprising:

a platform base, which supports said sensing means, and which fits over and matingly engages one of the hitch elements; and means for detachably securing said platform base to said one of the hitch elements.

2. A guidance apparatus, as set forth in claim 1, wherein said securing means comprises retractable means, in communication with said platform base, for exerting a compressive restraining force on said one of the hitch elements to prevent movement of said one of the hitch elements relative to the platform base.

3. A guidance apparatus, as set forth in claim 1, further comprising means for indicating to the operator of the towing vehicle directional instructions for manuevering the towing vehicle hitch element into alignment with the towed vehicle hitch element.

4. A guidance apparatus, as set forth in claim 3, wherein said indicating means comprises a display panel having signal means in electrical connection with said sensing means.

5. A guidance apparatus to assist the operator of a towing vehicle when maneuvering the towing vehicle to align a hitch element of the towing vehicle with a hitch element of a towed vehicle, the apparatus comprising:
electrical conductor line connectible between the two vehicles;
means, attachable to a hitch element, for providing different points to connect said line in order to accommodate hitch elements of different types and sizes while maintaining the accuracy of the guidance apparatus; and
means, operatively associated with the line, for sensing the relative positions of the towing vehicle hitch element and towed vehicle hitch element when maneuvering the towing vehicle to align the hitch elements.

6. A guidance apparatus, as set forth in claim 5, wherein said providing means comprises:
slotted means for receiving a hitch element;
means for detachably affixing the slotted means to the hitch element; and
at least two means for engaging said line.

7. A guidance apparatus, as set forth in claim 6, wherein said affixing means comprises a screw type bolt which communicates with said slotted means so that by tightening the screw type bolt said providing means can be attached to a hitch element.

8. A guidance apparatus, as set forth in claim 6, wherein said engaging means comprises at least two fin-like extensions to which said line can be detachably secured.

9. A guidance apparatus to assist the operator of a towing vehicle when maneuvering the towing vehicle to align a hitch element of the towing vehicle with a hitch element of a towed vehicle, the apparatus comprising:
electrical conductor line connectible between the two vehicles; and
means, operatively associated with the line, for sensing the relative positions of the towing vehicle hitch element and towed vehicle hitch element when maneuvering the towing vehicle to align the hitch elements, the sensing means comprising at least a first horizontally positioned contact switch that is actuated when contacted by the line when the towing vehicle hitch element has passed through and beyond a position of vertical alignment with the towed vehicle hitch element.

10. A guidance apparatus, as set forth in claim 9, wherein said first horizontally positioned contact switch encases said sensing means.

11. A guidance apparatus to assist the operator of a towing vehicle when maneuvering the towing vehicle to align a hitch element of the towing vehicle with a hitch element of a towed vehicle, the apparatus comprising:
electrical conductor line connectible between the two vehicles; and
means, operatively associated with the line, for sensing the relative positions of the towing vehicle hitch element and towed vehicle hitch element when maneuvering the towing vehicle to align the hitch elements, the sensing means comprising at least a first horizontally positioned contact switch that is actuated when contacted by the line when the towing vehicle hitch element is in vertical alignment with the towed vehicle hitch element.

12. A guidance apparatus, as set forth in claim 11, wherein said sensing means additionally comprises a second horizontally positioned contact switch that is actuated when contacted by said line when the towing vehicle hitch element is approaching a position of vertical alignment with the towed vehicle hitch element.

13. A guidance apparatus, as set forth in claim 12 wherein said second horizontally positioned contact switch resiliently engages said line when the towing vehicle hitch element is approaching a position of vertical alignment with the towed vehicle hitch element.

14. A guidance apparatus, as set forth in claim 11 wherein said sensing means additionally comprises a second horizontally positioned contact switch that is actuated when contacted by the line when the towing vehicle hitch element has passed through and beyond a position of vertical alignment with the towed vehicle hitch element.

15. A guidance apparatus, as set forth in claim 14 wherein said second horizontally positioned contact switch encases said sensing means.

16. A guidance apparatus, as set forth in claim 11, further comprising means for positioning said sensing means in such a manner that a vertical plane, which perpendicularly intersects said first horizontally positioned contact switch, will correspond with the vertical plane which bisects the hitch elements of the towing and towed vehicles when the hitch elements are in lateral alignment, so that additional procedures will not be required to reference the relative positions of the sensing means and hitch elements before using the guidance apparatus.

17. A guidance apparatus, as set forth in claim 11, wherein said sensing means additionally comprises a pair of side by side contact switches that are independently actuated when contacted by said line, which passes between the switches, such contact occurring when the towing vehicle approach path towards the towed vehicle deviates laterally from a desired path that ensures successful alignment of the hitch element.

18. A guidance apparatus to assist the operator of a towing vehicle when maneuvering the towing vehicle to align a hitch element of the towing vehicle with a hitch element of a towed vehicle, the apparatus comprising:
electrical conductor line connectible between the two vehicles; and
means, operatively associated with the line, for sensing the relative positions of the towing vehicle hitch element and towed vehicle hitch element when maneuvering the towing vehicle to align the hitch elements, said sensing means comprising a pair of side by side contact switches positioned to form a laterally extending V-shaped aperture through which the line is received in decreasing spatial relation, the switches being actuated when contacted by the line, such contact occurring when the towing vehicle approach path towards the towed vehicle deviates laterally from a desired path that ensures successful alignment of the hitch elements, the V-shaped aperture providing for increasing sensitivity to lateral deviations as the towing vehicle approaches the towed vehicle.

* * * * *